May 4, 1948.  B. H. RUSSELL  2,440,877
ADAPTOR PLATE FOR TOW BARS
Filed Oct. 28, 1946  2 Sheets-Sheet 1
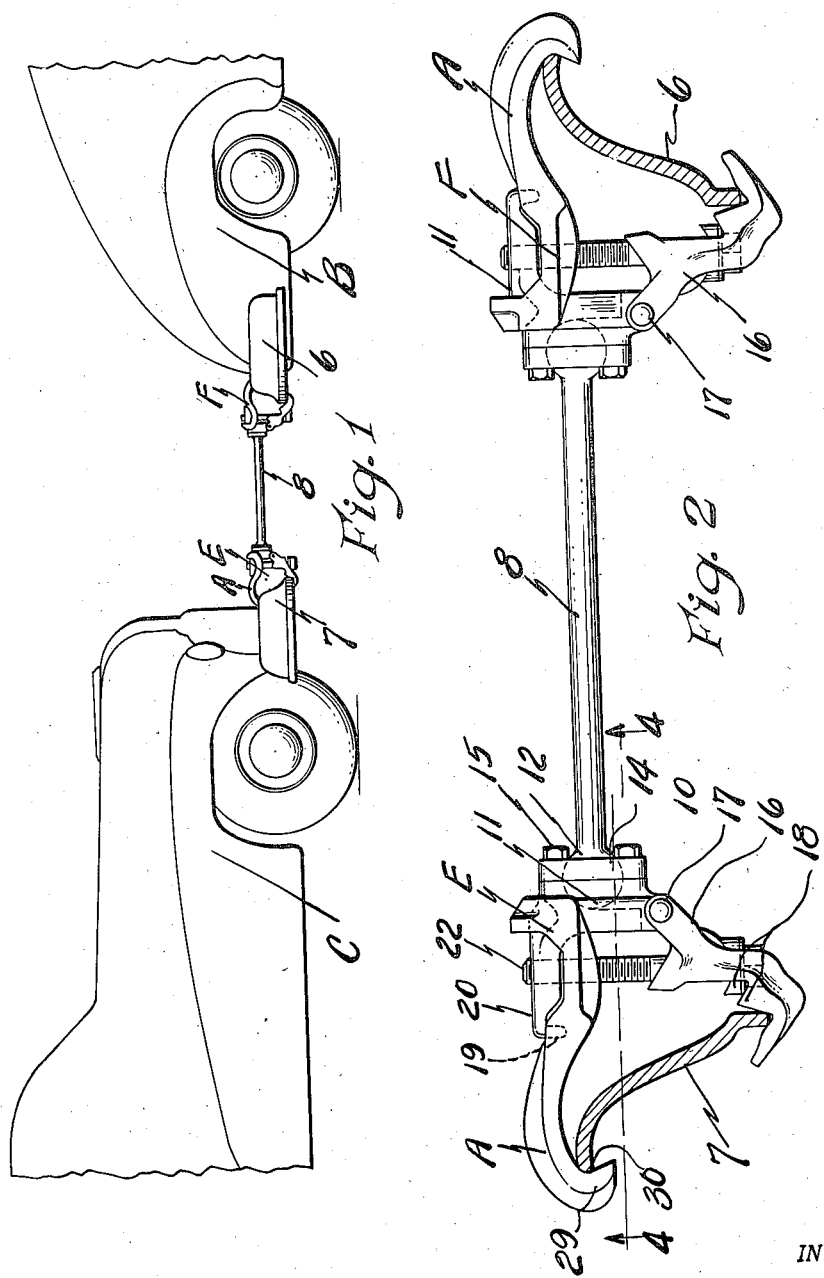
INVENTOR.
Boyd H. Russell.
By Frank C. Newman.
ATTORNEY

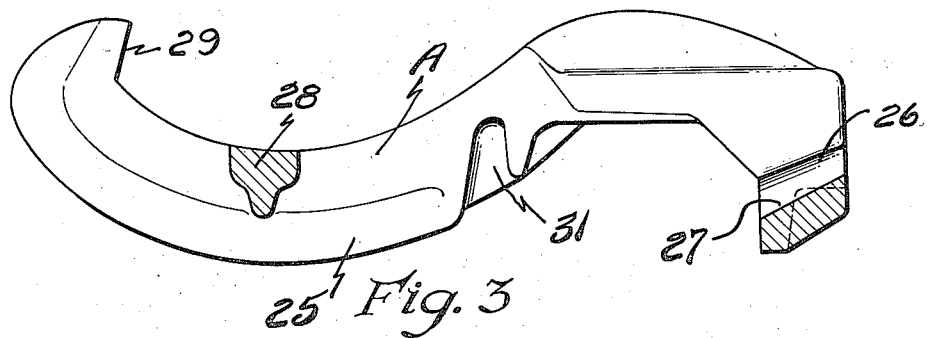
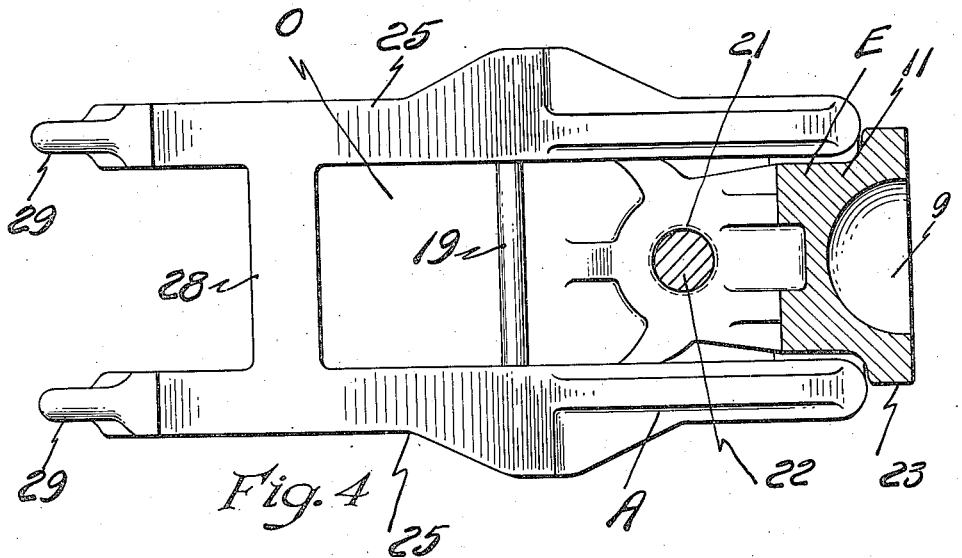
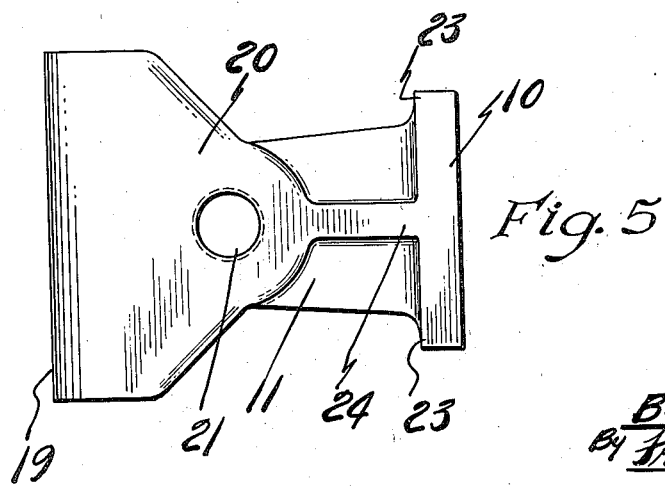

Patented May 4, 1948

2,440,877

UNITED STATES PATENT OFFICE 2,440,877

ADAPTOR PLATE FOR TOW BARS

Boyd H. Russell, Caro, Mich.

Application October 28, 1946, Serial No. 706,145

6 Claims. (Cl. 280—33.14)

This invention relates to adaptor plates for tow bars for coupling or locking motor vehicles together by engagement with the bumpers thereof.

One of the prime objects of the invention is to design an adaptor plate which, when in position, forms an extension of the tow bar clamps, so that the tow bar may be utilized to engage bumpers of various sizes and shapes, so that one vehicle may be coupled to another vehicle for towing at any reasonable speed and thereby eliminate the necessity of providing a driver for the towed vehicle.

Another object is to provide a very simple, practical and inexpensive adaptor plate which can be easily and quickly attached to and centered on a tow bar, so that the towed vehicle will be held in direct alignment with the towing vehicle, said assembly compensating for variations caused by unevenness of roadways, turning movement of the towing vehicle, or contact of the vehicle wheels with raised obstacles or other road irregularities.

A further object still is to design an adaptor plate which can be easily and quickly attached and/or detached, and which requires no additional securing means for securing it in position on the clamp.

With the above and other objects in view, the present invention consists in the combination and arrangement of parts, hereinafter more fully described, illustrated in the accompanying drawings, and more particularly described in the appended claims, it being understood that changes may be made in the form, size, proportion, and minor details of construction, without departing from the spirit, or sacrificing any of the advantages of the invention.

In the drawings:

Fig. 1 is a side-elevational view illustrating the application of the invention for towing purposes.

Fig. 2 is an enlarged, side-elevational view of the tow bar showing my adaptor plate in position thereon, and clamped to a bumper, the broken lines illustrating the swiveling action of the tow bar.

Fig. 3 is an enlarged, longitudinal sectional view through the adaptor plate.

Fig. 4 is a sectional plan view taken on the line 4—4 of Fig. 2 and looking in the direction indicated by the arrows.

Fig. 5 is an inverted plan view showing the flanges and rib on the clamp.

The instant invention relates to adaptor plates applicable to tow bars of all kinds so that the clamp assemblies which are readily reversible, may be lengthened to accommodate bumpers of various sizes, cross sectional shapes and curvatures.

Referring now to the drawings. The letters B and C indicate the towing vehicle and a towed vehicle respectively, the towing vehicle being equipped with a special rear bumper 6, and the towed vehicle also has a similar design bumper 7 shaped as clearly shown in Fig. 1 of the drawings.

The two bar structure shown in the instant application conforms generally to the structure shown in Patent No. 2,243,347 granted to Cletus A. Klein and myself, May 27, 1941, and readily fits conventional bumpers of uniform size and shape, but due to changes in bumper design, I find it necessary, in order to accommodate the new sizes and shapes, to increase the throat size and clamping range of the clamp assemblies, and I have, therefore, provided an adaptor plate A which is attachable to and forms an extension of the clamp, so that bumpers of any irregular cross-sectional shape and size may be engaged.

The tow bar 8 includes clamp assemblies E and F respectively, provided on the opposite ends thereof, these assemblies being of substantially the same design, and the operation is identical, excepting that the assembly E is mounted for universal movement, a socket 9 being provided in one leg 10 of the clamp 11, and accommodates a ball bolt 12 provided on the one end of the draw bar, a plate 14 being fitted over said ball, and bolts 15 serve to secure the plate in position.

A horizontally disposed jaw member 16 is pivotally secured to the one end of the clamp 11 by means of a bolt 17, said member being formed with spaced-apart jaws 18 to suit various size bumpers, and a similar horizontally disposed jaw 19 is provided on the leg 20 of the clamp 11.

Inasmuch as the bumpers 6 and 7 are irregular in cross section and as shown in Fig. 2 of the drawings, I rotate the assembly E so that the clamp 11 is located at the top and the adaptor plate A is mounted thereon in inverted position, vertically aligned openings 21 being provided in the jaw sections 16 and 20 and accommodate a bolt 22 so that the jaws may be drawn towards each other to clamp the assembly to a bumper.

The clamp 11 is angular in shape, the flanges 23 being cast integral with the section 10, and a centrally disposed rib 24 is provided on the lower edge of the clamp (see Fig. 5) and for a purpose to be presently described.

The adaptor plate A is formed as clearly shown in Figs. 3 and 4 of the drawings; it comprises a rectangular shaped, preferably cast frame A which includes spaced apart parallel curved side bars 25, the rear ends of which are connected by a back bar 26 which depends below the side bars, and which is provided with a pocket 27 intermediate its length to accommodate the rib 24, this back bar 26 bearing against the lower rear edge of the clamp 11 with the rib 24 seated in the pocket 27 and serving to center the adaptor plate on the clamp assembly.

A transversely disposed rib 28 serves to connect the side bars 25 at a point spaced from the front end of the plate, the front ends of said side bars having jaws 29 cast integral therewith for engaging the edges 30 of the bumper 7.

Notched seats 31 are provided in the lower face of the parallel side bars 25 and are shaped to seat and accommodate the jaw 19 of the clamp 11, the outer edge of each pocket 27 being closed to prevent sidewise movement of the plate thereon.

The adaptor can be easily and quickly applied; it requires no bolts or other securing means; it is merely necessary to tilt the adaptor plate A so that the leg 20 of the clamp 11 passes through the opening O in said plate; thence the plate is aligned on the clamp so that the rib 24 seats in the pocket 27, with the ends of the side bars 25 bearing against the flanges 23 of the clamp 11, with the jaw 19 accommodated in the notched seats 31 provided in the side bars of the adaptor plate, and the operation of the device is then the same as described in the patent herein referred to.

The clamp assembly E, due to its universal mounting, can be turned in any direction to suit irregular-shaped bumpers and to facilitate the mounting thereof.

This adaptor is simple and economical to manufacture; it can be quickly applied and enables conventional tow bars to be used with bumpers of irregular shape and design.

From the foregoing description, it will be clearly obvious that I have perfected a very simple practical and convenient adaptor plate for use on automobile tow bars and the like.

What I claim is:

1. The combination with a tow bar formed with an angularly shaped clamp including a jaw section, a similar jaw section pivotally connected to said clamp, of an adaptor plate detachably mounted on one of said jaw sections and forming a substantially horizontal extension thereof, with its rear section bearing against the rear edge of said jaw, and means for securing the jaws and plate to a vehicle bumper.

2. The combination as defined in claim 1 in which seats are provided in the lower face of the adaptor plate to accommodate the teeth of one of said jaw sections.

3. The combination set forth in claim 1 in which a centrally disposed seat is provided on the rear section of the adaptor plate to accommodate a rib on the clamp and to center the plate on one of the jaw sections.

4. The combination as defined in claim 1 in which the clamp is formed with a centrally disposed rib and an extending jaw section, the adaptor plate comprising a rectangular frame formed with spaced-apart side bars, front and rear bar sections connecting said side bars, and seats in the rear bar and side bars to accommodate the rib and jaw sections respectively of the clamp.

5. An adaptor plate for automobile tow bars comprising a rectangular-shaped frame terminating in an upturned jaw section, the rear bar section of said frame depending below the side bars and being formed with a rib accommodating pocket therein, and notches provided in the lower face of the side bars at points intermediate their length.

6. The combination with a clamping jaw, of a vehicle tow bar comprising, a substantially rectangular-shaped adaptor plate adapted to fit over the jaw section of the clamp and form an extension thereof, the rear end of said plate bearing against the rear lower face of the clamp, and being formed with a jaw on the outer end thereof for engagement with a vehicle bumper.

BOYD H. RUSSELL.